United States Patent Office

3,202,661
Patented Aug. 24, 1965

3,202,661
SUBSTITUTED 3-AMINO 4-PHENYL QUINOLONES
Bernard Brust, Clifton, Rodney Ian Fryer, West Orange, and Leo Henryk Sternbach, Upper Montclair, N.J., assignors to Hoffmann-La Roche Inc., Nutley, N.J., a corporation of New Jersey
No Drawing. Filed Nov. 27, 1962, Ser. No. 240,406
8 Claims. (Cl. 260—288)

This invention relates to novel therapeutically useful phenyl substituted heterocyclic compounds as well as methods for their preparation and intermediates therefor. More particularly, the phenyl substituted heterocyclic compounds of this invention are 4-phenyl-2(1H)-quinolones of the formula:

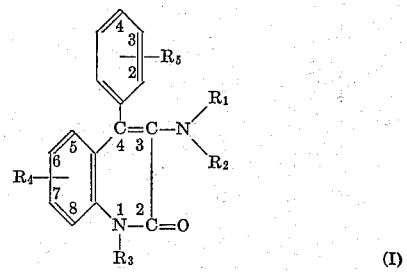

wherein $R_1$ and $R_2$ are each selected from the group consisting of hydrogen and lower alkyl and, taken together, lower alkylene; $R_3$ is selected from the group consisting of hydrogen and lower alkyl; and $R_4$ and $R_5$ are each selected from the group consisting of hydrogen, halogen, trifluoromethyl, nitro, lower alkylmercapto and lower alkoxy $R_4$ being other than halogen when $R_5$ is hydrogen.

The numbering of the quinolone ring, as well as the 4-phenyl ring substituent, are shown in Formula I above for the purposes of convenience. This numbering is in accord with that shown for quinoline in the Ring Index (Patterson et al., 2nd edition, 1960) system 1707.

As used above, the term lower alkyl refers to straight and branched chain saturated hydrocarbon compounds such as methyl, ethyl, isopropyl and the like. The term lower alkylene refers to lower alkyl carbon chains such as pentylene and the like. The term halogen includes all four halogens, bromine, chlorine, fluorine and iodine. Lower alkylmercapto refers to compounds such as methylmercapto and the like, and lower alkoxy refers to compounds such as methoxy and the like.

Compounds of Formula I above form acid addition salts with both organic and inorganic acids. Thus, they form pharmaceutically acceptable acid addition salts with medically acceptable acids such as nitric acid, sulfonic acid, phosphoric acid, acetic acid, formic acid, succinic acid, maleic acid, malonic acid, methanesulfonic acid, toluenesulfonic acid, and the like.

The compounds of Formula I above can be prepared by a variety of methods. For example, compounds of Formula I, wherein $R_1$ and $R_2$ are both hydrogen can be prepared by cyclization of a 2-(lower alkanoylamino-acetamido)-benzophenone. These intermediates are a novel class of compounds and form a part of this invention. They can be prepared by acylation of a 2-(amino-acetamido)-benzophenone of the formula:

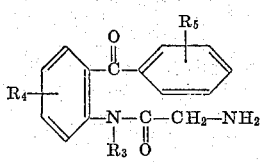

wherein $R_3$, $R_4$ and $R_5$ have the same meaning as above.

The acylation can be effected by means of conventional acylating agents such as, for example, acetic anhydride. The so-formed 2-(acylaminoacetamido)-benzophenones are of the formula:

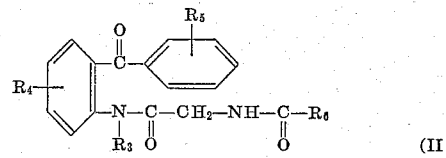

wherein $R_3$, $R_4$ and $R_5$ have the same meaning as above, and $R_6$ is lower alkyl.

The compounds of Formula III above can also be prepared by treatment of a 5-phenyl-3H-1,4-benzodiazepin-2(1H)-one with acetic anhydride in the presence of a catalytic amount of a base or acid, such as concentrated sulfuric acid or potassium acetate.

The 2-(acylaminoacetamido)-benzophenones of Formula III can be cyclized to 3-acylamino-4-phenyl-2(1H)-quinolones by refluxing in a pyridine, piperidine mixture. The 3-acylamino-4-phenyl-2(1H)-quinolones so produced are a novel class of compounds and are of the formula:

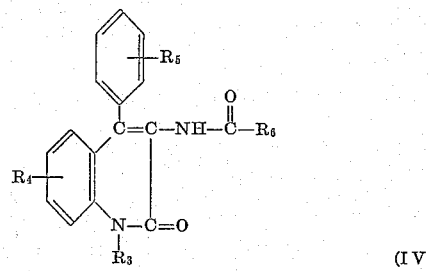

wherein $R_3$, $R_4$, $R_5$ and $R_6$ have the same meaning as above.

These compounds are hydrolyzed to compounds of Formula I above wherein $R_1$ and $R_2$ are hydrogen by conventional hydrolysis means, for example, by heating in the presence of a mineral acid, for example, sulfuric acid. It has been found that in certain cases cyclization of the 2-(acylaminoacetamido)-benzophenone of Formula III directly yields the hydrolyzed compound of Formula I or a mixture of the hydrolyzed product of Formula I and the intermediate acylamino-quinolone of Formula IV. In the latter case the mixture can be subjected to hydrolysis treatment, so as to yield only the compound of Formula I, or the acyl-quinolone can be separated and hydrolyzed.

Compounds of Formula I where the 3-amino nitrogen atom is secondary or tertiary can be prepared via cyclization of 2-(N-substituted-aminoacetamido)-benzophenone of the formula:

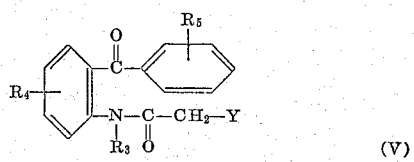

wherein Y is lower alkylamino, di-lower alkylamino, or lower alkyleneimino; and $R_3$, $R_4$ and $R_5$ have the same meaning as above.

Various cyclization methods can be used, for example, compounds of Formula V can be heated in the presence of alkali in a polar solvent. Suitably, a water-lower alkanol solution of an alkali metal hydroxide is used, for example, a water-ethanol solution of sodium hydroxide. Alternatively, the compounds of Formula V can be heated in a solution of a molar equivalent of acetic anhydride in an organic solvent such as toluene. If desired, greater amounts of acetic anhydride can, of course, be used. The above methods of cyclizing compounds of Formula V directly yield compounds of Formula I.

Compounds of Formula I, wherein $R_3$ is lower alkyl can be prepared from compounds of Formula II wherein $R_3$ is hydrogen by treatment of a compound of Formula II with sodium methoxide and then with a compounds of the formula:

$$R_3\!-\!X \qquad (VI)$$

wherein $R_3$ is lower alkyl and X is halogen, alkylation and ring closure occurring simultaneously. Compounds of Formula I wherein $R_3$ is lower alkyl can also be prepared from compounds of Formula I wherein $R_3$ is hydrogen. Alkylation can be effected, for example, by treatment of a compound of Formula I wherein $R_3$ is hydrogen with sodium methoxide and a lower alkyl halide. If desired, compounds of Formula I, wherein $R_1$ and $R_2$ are lower alkyl, can simultaneously be prepared from compounds of Formula I wherein $R_1$ and $R_2$ are hydrogen by using a suitable alkylating agent, for example, trimethylphosphate.

Compounds of Formula I can also be prepared from compounds of Formula II by a variety of methods besides those already set forth, for example, by fusion, by refluxing in a high boiling solvent such as toluene, or by heating a concentrated solution of a compound of Formula II. These procedures, however, are not generally applicable to all compounds of the series and have been found not to give consistent yields. Hence, the procedures described in the immediately preceding paragraphs constitute preferred methods of preparing the compounds of Formula I.

The compounds of Formula I above, as well as their pharmaceutically acceptable acid addition salts, are therapeutically active substances useful as anticonvulsants. They can be administered internally, for example orally or parenterally, with dosage adjusted to individual requirements. They can be administered in the form of conventional chemical formulations, both solid and liquid, such as capsules, tablets, dragees, suppositories, suspensions, emulsions and the like, in mixture with standard pharmaceutical carriers or adjuvants.

The following examples are illustrative, but not limitative of the invention. All temperatures are stated in degrees centigrade.

Example I

A mixture of 6.8 g. of 2-aminoacetamido-5-chlorobenzophenone, 9.54 g. of acetic anhydride and 8.7 g. of sodium acetate hydrate was warmed on a steambath for three hours. 500 ml. of hot water was then added and the crystalline product obtained upon cooling was filtered off and washed with water. The so-obtained crude product was dissolved in 100 ml. of methylene chloride, dried over anhydrous sodium sulfate, and filtered over 10 g. of alumina. Concentration of the filtrate and crystallization of the residual oil from an acetone/hexane mixture yielded 2-acetylaminoacetamido-5-chlorobenzophenone as white rods melting at 137–139°.

A solution of 2.0 g. of 2-acetylaminoacetamido-5-chlorobenzophenone in 15 ml. of piperidine and 5 ml. of pyridine was refluxed for 6 hours, then concentrated in vacuo to an oil. Crystallization from a methanol-water mixture gave 3-acetamido-6-chloro-4-phenyl-2(1H)-quinolone hemihydrate as colorless rods melting at 210–214°, reset M.P. 276–284°.

A solution of 2.7 g. of 3-acetamido-6-chloro-4-phenyl-2(1H)-quinolone in 40 ml. of 70% (v./v.) sulfuric acid and 5 ml. of acetic acid was refluxed for 5 hours. The reaction mixture was then poured over 100 g. of ice, diluted to 250 ml. with water, and adjusted to pH 9 with sodium carbonate solution (30% w./v.). The crude precipitate was separated by filtration and recrystallized from acetone, yielding 3-amino-6-chloro-4-phenyl-2(1H)-quinolone as white needles melting at 239–242°.

By the above described three-step method, commencing from the appropriate 2-aminoacetamido-benzophenones, the following 3-amino-4-phenyl-2(1H)-quinolones were prepared.

6-chloro-3-amino-4-(2-fluorophenyl)-2(1H)-quinolone, M.P. 261–262°.
 (Recrystallized from acetone)
6-bromo-3-amino-4-(2-fluorophenyl)-2(1H)-quinolone, M.P. 267–268°.
 (Recrystallized from acetone)
6-chloro-3-amino-4-(2-methylmercaptophenyl)-2(1H)-quinolone, M.P. 263–264°.
 (Recrystallized from ethyl acetate/hexane)
6-trifluoromethyl-3-amino-4-phenyl-2(1H)-quinolone, M.P. 210–211°.
 (Recrystallized from benzene)
6-bromo-3-amino-4-(2-trifluoromethylphenyl)-2(1H)-quinolone, M.P. 333–333.5°.
 (Recrystallized from acetone)
3-amino-4-(2-trifluoromethylphenyl)-2(1H)-quinolone, M.P. 190–192.5°.
 (Recrystallized from ethyl ether)
5-chloro-3-amino-4-phenyl-2(1H)-quinolone, M.P. 212–214°.
 (Recrystallized from acetonitrile)

The following 2-aminoacetamidobenzophenones and their preparation are not a part of this invention, but such are disclosed hereinbelow in order that this disclosure may be complete.

A mixture of 176 g. (1.125 m.) of ortho-fluoro benzoyl chloride and 64 g. (0.5 m.) of para-chloraniline was stirred and heated to 180° C., at which temperature 87 g. (0.64 m.) of zinc chloride was introduced, the temperature raised to 200–205° C. and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone yellow needles (M.P. 94–95° C.).

A solution of sodium methylmercaptan (96 ml. of a solution containing 200 m. moles of NaSCH$_3$) in 2-ethoxyethanol was refluxed for three hours with 25 g. of 2-amino-5-chloro-2'-fluorobenzophenone. The solution was concentrated to approximately 30 ml. by distillation and the residue partitioned between methylene chloride (200 ml.) and water (200 ml.). The layers were separated, and the organic layer was washed with 3 N hydrochloric acid (2 x 100 ml.), water (3 x 100 ml.), dried over anhydrous sodium sulfate, filtered and concentrated to give as an oil crude 2-amino-5-chloro-2'-methylthiobenzophenone. Upon being recrystallized from hexane it formed yellow plates M.P. 100–100.5°.

The crude 2-amino-5-chloro-2'-methylthiobenzophenone from the previous reaction was dissolved in 200 ml. of ether and 21 ml. of bromoacetyl bromide was added with stirring. After the reaction had subsided, the reaction mixture was washed with water (3 x 100 ml.) and concentrated to a small volume. The product was filtered and recrystallized from methanol to give 2-bromoacetamido-5-chloro-2'-methylthiobenzophenone, as white needles, M.P. 107–8°.

4.0 g. of 2-bromoacetamido-5-chloro - 2' - methylthiobenzophenone was carefully added to 200 ml. of liquid ammonia. The ammonia was allowed to evaporate overnight and the residue was partitioned between ether (400 ml.) and water (1 liter). The layers were separated and the ether layer was washed with water (3 x 200 ml.), dried over anhydrous sodium sulfate, filtered and concentrated to approximately 75 ml. Petroleum ether (10 ml.) was added and the mixture cooled. The product was filtered yielding 2-aminoacetamido-5-chloro - 2' - methylthiobenzophenone, as yellow plates, M.P. 125–6°.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice and the mixture then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°.

60 g. of 2-chloro-5-trifluoromethylbenzophenone imine hydrochloride were refluxed overnight with a mixture of 300 ml. of toluene and 300 ml. of 50 percent (by weight) sulfuric acid while stirring. The toluene layer was separated, washed with water, dried, concentrated in vacuo and the residue crystallized from hexane to yield pure 2-chloro-5-trifluoromethylbenzophenone, M.P. 39–40°.

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann activity state II). Elution with a hexane-ether mixture (1:1) and evaporation of the solvent gave 2 - amino - 5 - trifluoromethylbenzophenone which, when recrystallized from hexane, formed yellow crystals melting at 81–82°.

26.5 g of 2-amino-5-trifluoromethyl-benzophenone were dissolved in 250 ml. of anhydrous ether and 7.9 ml. of pyridine. The resulting soluton was stirred and cooled to 0° and then treated over a period of 30 minutes with a solution of 23.2 g. of bromoacetylbromide in 50 ml. of anhydorus ether. After stirring for another half hour at 0°, the resulting suspension was stirred for 3 hours at room temperature and treated with water. The ether layer was separated and concentrated in vacuo yielding 39.2 g. of an oil. Crystallization from 60 ml. of benzene and 90 ml. of hexane afforded a first crop of 2-bromoacetamido-5-trifluoromethyl-benzophenone in the form of needles. From the mother liquor, a second crop could be obtained. Recrystallization from benzene-hexane gave an analytical sample, melting at 103–104°.

5.0 g. of 2-bromoacetamido-5-trifluoromethyl-benzophenone were dissolved in 150 ml. of anhydrous ether and added over a period of 1 hour with stirring to 50 ml. of liquid ammonia. The resulting solution was stirred for 5 hours at the reflux temperature of ammonia, a Dry-Ice-acetone condenesr being used. This was then replaced with a conventional water-condenser and the ammonia allowed to distill off overnight. The resulting suspension, after standing for 5 days at room temperature, was treated with water, the ether separated and then concentrated in vacuo to give crude 2-aminoacetamido-5 - trifluoromethylbenzopheneone. Crystallization from 6 ml. of benzene and 15 ml. of hexane gave a pure product, melting at 97–99°.

35 g. of o-chlorobenzotrifluoride was converted to the Grignard reagent in the usual way with 4.63 g. of magnesium and 30 cc. of dry tetrahydrofuran diluted with 100 cc. of ether. The solution was then added dropwise under nitrogen with cooling and stirring to 30 g. of 6-bromo-2-methyl-4H-3,1-benzoxazin-4-one dissolved in 200 cc. of dry toluene. The resulting solution was stirred for 1 hour at room temperature, then refluxed for 1 hour, cooled in an ice bath and the Grignard complex decomposed with 36 cc. of 5 N hydrochloric acid. The mixture was then washed with water, ammonium chloride solution, and finally with aqueous ammonia. The organic layer was separated, concentrated in vacuo and the residue refluxed for 1 hour with a mixture of 50 cc. of concentrated hydrochloric acid in 50 cc. of ethanol. Then the solvents were distilled off and the residue treated with 20 cc. of water whereupon a solid separated. After drying, it was crystallized from hexane yielding 2-amino-5-bromo-2'-trifluoromethyl-benzophenone melting at 92–94°.

A solution of 21.9 g. of 2-amino-5-bromo-2'-trifluoromethyl benzophenone was dissolved in 250 cc. of ether and treated with 13.8 g. of bromoacetyl bromide. After the addition the mixture was stirred for 1 hour and the solvent removed. The residue was crystallized from methanol yielding 5-bromo-2-bromo - acetamido-2'-trifluoromethyl-benzophenone as white prisms melting at 140.5–141.5°.

26.4 g. of 5-bromo-2-bromoacetamido-2'-trifluoromethyl-benzophenone was added to 750 cc. of liquid ammonia and the mixture was warmed gently on the steam bath to facilitate evaporation of the ammonia. The residue was then partitioned between 200 cc. of methylene chloride and 300 cc. of water. The layers were separated and the organic layer washed with water (3 x 50 cc.), saturated brine (3 x 25 cc.), dried over anhydrous sodium sulfate, filtered, and evaporated to dryness. Recrystallization of the residue from acetone gave 5-bromo-2-aminoacetamido - 2' - trifluoromethylbenzophenone, as a crystalline material, and an oily residue. The crude aminoacetamido compound was not further purified.

A solution of o-trifluoromethyl phenyl magnesium bromide was prepared in the usual manner from 50.0 g. of o-bromobenzotrifluoride, 5.55 g. of magnesium and 110 ml. of anhydrous ether. This solution was added with stirring at 20° over a period of 3 hours to a solution of 33.0 g. of 2-methyl-4H-3,1-bezoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; i.e. containing 6 percent of water). Elution with petroleum ether (60–70°) and a mixture of petroleum ether (60–70°) and ether (9:1) followed by crystallization from a mixture of ether and hexane yielded 2-amino-2'-trifluoromethylbenzophenone melting at 94–96° (yellow prisms).

To a solution of 5.0 g. of 2-amino-2'-trifluoromethylbenzophenone in 25 ml. of anhydrous ether, cooled to 0°, 1.7 ml. of bromoacetyl bromide was added with stirring; a precipitation occurred and the yellow color of the solution gradually faded. The suspension containing 2-bromoacetamido-2'-trifluoromethylbenzophenone was stirred for half an hour at 0° and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-aminoacetamido - 2' - trifluoromethyl-benzophenone. Recrystallization from a mixture of 15 ml. of benzene and 15 ml. of hexane gave the pure product, melting at 141–142° (colorless, rhombic plates).

*Example 2*

A mixture of 20 g. of 7-chloro-5-phenyl-3H-1, 4-benzodiazepin-2(1H)-one, 27.5 g. of acetic anhydride and 25.0 g. of sodium acetate hydrate was refluxed for two hours. The reaction mixture was poured into 500 ml. of hot water and the crystalline product, upon cooling, was filtered off and washed with water. The so-obtained crude product was dissolved in 100 ml. of metylene chloride, dried over anhydrous sodium sulfate, and filtered over 10 g. of alumina. Concentration of the filtrate and crystallization of the residual oil from an acetone/hexane mixture yielded 2-acetylaminoacetamido-5-chloro-benzophenone melting at 137–139°.

*Example 3*

A mixture of 15.0 g. of 2-aminoacetamido-5-chloro-2'-methoxybenzophenone, 19.2 g. of acetic anhydride and 17.4 g. of sodium acetate hydrate was reacted by the method set forth in Example 1, yielding 2-acetylaminoacetamido - 5 - chloro - 2' - methoxybenzophenone hydrate, which upon crystallization from a methylene chloride-ether mixture formed colorless needles melting at 190–192°.

A solution of 10.3 g. of 2-acetylaminoacetamido-5-chloro-2'-methoxybenzophenone in 75 ml. of piperidine and 25 ml. of pyridine was refluxed for 12 hours and then concentrated in vacuo to an oil. Crystallization from a methanol-ether mixture yielded 3-acetylamino-6-chloro-4-(2-methoxyphenyl)-2(1H)-quinoline as colorless prisms melting at 268–274°.

1 g. of 3-acetylamino-6-chloro-4-(2-methoxyphenyl)-2 (1H)-quinolone was suspended in 35 ml. of hydrochloric acid and refluxed for 120 hours. The reaction mixture was cooled, diluted to 100 ml. with water and the crude product separated by filtration the precipitate was washed acid free with water and recrystallized from acetone, yielding 3 - amino - 6 - chloro - 4 - (2 - methoxyphenyl)-2(1H)-quinolone as colorless prisms melting at 248–250°.

The above-mentioned 2-aminoacetamido-5-chloro-2'-methoxybenzophenone and its preparation are not a part of this invention, but such are set forth hereinbelow in order that this disclosure may be complete.

A solution of 1.55 g. of 2-bromoacetamido-5-chloro-2'-methoxybenzophenone in 20 ml. of methylene chloride was poured into 50 ml. of liquid ammonia. The reaction mixture was allowed to stand for 15 minutes and the ammonia was evaporated on a steambath. The organic layer was washed with water (3 x 25 ml.), brine (25 ml.), dried over anhydrous sodium sulfate, and concentrated to an oil. The oil was crystallized from an ether-petrol mixture giving 2-aminoacetamido-5-chloro-2'-methoxybenzophenone as colorless needles melting at 109–111.5°.

*Example 4*

A mixture of 2.94 g. of 2-aminoacetamido-5-nitrobenzophenone, 6.33 g. of acetic anhydride and 3.62 g. of sodium acetate hydrate was treated according to the procedure described in Example 1, yielding 2-acetylaminoacetamido-5-nitrobenzophenone as colorless rods which were crystallized from an acetone/petroleum ether mixture and melted at 160–162°.

A solution of 2.5 g. of 2-acetylaminoacetamido-5-nitrobenzophenone in 21 ml. piperidine and 7 ml. pyridine was refluxed for twenty-three hours and then concentrated in vacuo to an oil. Crystallization from dilute acetic acid gave 3-amino-6-nitro-4-phenyl-2(1H)-quinolone as yellow prisms melting at 330–332.5°. Concentration of the mother liquors and filtration over a small pad of alumina in methylene chloride yielded 3-acetylamino-6-nitro-4-phenyl-2(1H)-quinolone which was hydrolyzed without further purification by refluxing in a solution of 50 ml. of ethanol and 10 ml. of 3 N sodium hydroxide for 3 hours. Neutralization of the reaction mixture with 3 N hydrochloric acid yielded 3-amino-6-nitro-4-phenyl-2 (1H)-quinolone melting at 330–332°.

The above-mentioned 2-aminoacetamido-5-nitrobenzophenone and its preparation are not a part of this invention but such are disclosed hereinbelow in order that this disclosure may be complete.

To a solution of 7.26 g. of 2-amino-5-nitrobenzophenone in 350 cc. of benzene was added 2.8 cc. of bromoacetyl bromide. Dry air was blown through the solution until all the hydrogen bromide was removed. The benzene solution was washed with water until the washings were neutral, then dried over sodium sulfate and concentrated in vacuo. The residue was crystallized from a mixture of benzene and petroleum ether to give 2-bromoacetamido-5-nitrobenzophenone in the form of colorless needles melting at 155–156°.

A solution of 5 g. of 2-bromoacetamido-5-nitrobenzophenone in 75 cc. of dioxane was treated with 25 cc. of a 10% solution of ammonia in methanol (wt./vol.). The solution was allowed to stand at room temperature for 4 hours and then partitioned between 250 cc. of ether and 150 cc. of 0.1 N hydrochloric acid. The ether solution was again extracted with 90 cc. of 0.1 N hydrochloric acid. The combined acid extracts containing the reaction product were then extracted twice with 100 cc. of ether and then treated with an excess of ammonium hydroxide solution. The precipitated 2-amino-acetamido-5-nitrobenzophenone was filtered off and dried in vacuo. On recrystallization from chloroform and ether it forms light straw colored needles melting at 166–167° (dec.).

*Example 5*

A mixture of 3.2 g. of 5-chloro-2-methylaminoacetamido-2'-fluorobenzophenone, 0.2 g. of sodium hydroxide, 60 ml. of water and 45 ml. of ethanol was refluxed for two hours and then cooled in an ice bath. The precipitate was separated by filtration and washed free of alkali with water. Recrystallization from an acetone-petrol mixture yielded 6-chloro-4-(2-fluorophenyl)-3-methylamino-2(1H)-quinolone as colorless needles melting at 253–254°.

The above-mentioned 5-chloro-2-methylaminoacetamido-2'-fluorobenzophenone and its preparation are not a part of this invention, but such are disclosed hereinbelow in order that this disclosure may be complete.

A solution of 20 g. of 2-bromo-4'-chloro-2'-(2-fluorobenzoyl)-acetanilide in 600 ml. of tetrahydrofuran was saturated at room temperature with methylamine gas. The mixture was then stirred for one hour and concentrated under reduced pressure. The mixture of reaction product and methylammonium bromide was partitioned between methylene chloride and water (300 ml:300 ml.), the organic layer was then separated, washed with water (5 x 300 ml.), dried over anhydrous sodium sulfate, filtered and concentrated to an oil. The product was crystallized from an ether, petroleum ether (B.P. 30–40°) mixture yielding 4'-chloro-2'-(2-fluorobenzoyl)-2-methylaminoacetanilide as pale yellow prisms melting at 85–86°.

Example 6

19.5 g. of 2-(dimethylaminoacetamido)-5-chloro-2'-fluoro-benzophenone was refluxed in a mixture of 150 ml. of toluene and a molar equivalent of acetic anhydride for 64 hours. The solvent was distilled off until the reaction mixture attained a volume of 25 ml., and then 50 ml. of acetone was added. The product was separated by filtration and recrystallized from acetone, yielding 6-chloro-3-dimethylamino-4-(2-fluorophenyl)-2(1H)-quinolone as pale yellow prisms melting at 318–320°.

In the same manner as above from appropriate 2-(N-substituted aminoacetamido)-benzophenones, the following were prepared:

6-chloro-3-diethylamino-4-(2-fluorophenyl)-2(1H)-quinolone, M.P. 245–248°.
(Recrystallized from acetone)
6-chloro-3-dimethylamino-4-(2-chlorophenyl)-2(1H)-quinolone, M.P. 263–267°.
(Recrystallized from acetone)
6-chloro-3-(1-piperidyl)-4-phenyl-2(1H)-quinolone, M.P. 299–301°.
(Recrystallized from dichloromethane)
3-dimethylamino-4-(2-chlorophenyl)-2(1H)-quinolone, M.P. 161–163°.
(Recrystallized from acetone)

The following 2-(N-substituted-aminoacetamido)-benzophenones and their preparation are not a part of this invention, but such are disclosed hereinbelow in order that this disclosure may be complete.

A solution of 28.7 g. of 2-bromo-4'-chloro-2'-(2-fluorobenzoyl) acetanilide in 800 ml. of tetrahydrofuran was treated with dimethylamine gas and worked up as described in Example 105. The product was recrystallized from hexane yielding 4'-chloro-2-dimethylamino-2'-(2'-fluorobenzoyl) acetanilide as yellow prisms melting at 77–78°.

A solution of 10 g. of 2-bromacetamido-2',5-dichlorobenzophenone in tetrahydrofuran 150 ml., was saturated with dimethylamine. The solution was then stirred overnight at room temperature and worked up by evaporating the solvent and extracting the residue with ether. The extract was then washed with water and concentrated to a small volume. Addition of petroleum ether yielded crystals of 2',5-dichloro-2-dimethyl-aminoacetamido-benzophenone melting at 112–114°.

A solution of 40 g. of 2-bromoacetamido-5-chlorobenzophenone in 100 ml. of piperidine was heated, with stirring, at 90° for 1 hr. The reaction mixture was filtered and the filtrate concentrated to a small volume under reduced pressure. The residue, dissolved in 200 ml. of methylene chloride, was washed with water (2 x 100 ml.), saturated brine (2 x 50 ml.), dried over anhydrous sodium sulfate, filtered and concentrated. Recrystallization of the product from methanol gave 2'-benzoyl-4'-chloro-2-piperidinoacetanilide as colorless prisms melting at 99–100.5°.

Over a period of 1 hr., dimethylamine gas was bubbled into a solution of 5 g. of 2-bromoacetamido-2'-chlorobenzophenone in 75 ml. of methylene chloride. The resulting solution was washed with water (2 x 100 ml.), dried over anhydrous sodium sulfate, filtered and evaporated to an oil. The residue was recrystallized from hexane to give 2'-(2-chlorobenzoyl)-2-dimethylaminoacetanilide as pale yellow prisms melting at 103–105°.

Example 7

15.5 g. of 5-chloro-2-dimethylaminoacetamido-2'-fluoro-benzophenone was dissolved in 50 ml. of N,N-dimethylformamide and 13.1 ml. of a solution of sodium methoxide in methanol (4.35 m. mole/ml.) was added. The reaction mixture was stirred at room temperature for 10 minutes and 16.5 g. of methyl iodide then rapidly added. A vigorous heat of reaction elevated the temperature to 80°. The reaction mixture was stirred for thirty minutes, concentrated in vacuo and the residue crystallized from methanol. Recrystallization from methanol yielded 3-dimethylamino-4-(2-fluorophenyl)-1-methyl-6-chloro-2(1H)-quinolone as yellow prisms melting at 178–180°.

From 5-chloro-2-methylaminoacetamido-2'-fluorobenzophenone, using the above described method, 6-chloro-1-methyl-3-methyl-amino-4-(2-fluorophenyl)-2(1H)-quinolone was obtained. It melted at 157–158° after recrystallization from ether.

Example 8

A mixture of 7.0 g. of 6-chloro-3-(dimethylamino)-4-(2-phenyl)-2(1H)-quinolone 1.4 g. of sodium methoxide and 50 ml. of N,N-dimethylformamide was stirred for 1.5 hours at room temperature, cooled to 5° in an ice-salt bath, and 3.9 g. of methyl iodide added dropwise so that the temperature was kept between 0° and 10°. The reaction mixture was stirred at room temperature for 1.5 hours, poured into 1 l. of water and extracted with methylene chloride (4 x 200 ml.). The combined methylene chloride extracts were washed with water (3 x 250 ml.), dried over anhydrous sodium sulfate and concentrated to an oil. The oil was crystallized from ether, yielding 6-chloro-4-(2-fluorophenyl)-1-methyl-3-dimethylamino-2(1H)-quinolone as colorless prisms melting at 157–158°.

Example 9

A mixture of 0.40 g. of 3-amino-6-chloro-4-phenyl-2(1H)-quinolone, 30 ml. of methanol, and 0.41 ml. of a solution of sodium methoxide in methanol (4.35 m. mole/ml.) was stirred at room temperature for 30 minutes and then cooled in an ice bath. Methyl iodide [2.13 g. (0.015 mole)] was added, the solution stirred at room temperature for three hours and then concentrated in vacuo to an oil which was dissolved in 50 ml. of methylene chloride, washed with 25 ml. of water, 25 ml. of brine, dried over anhydrous sodium sulfate and concentrated to an oil. The so-obtained oil was then dissolved in 25 ml. of methylene chloride and filtered over a small amount of alumina. Concentration of the filtrate and crystallization of the residual oil from an acetone-petrol mixture yielded 3-amino-6-chloro-1-methyl-4-phenyl-2(1H)-quinolone as pale yellow rods melting at 130–133°.

Example 10

A solution of 5 g. of 2-amino-2'-(2-nitrobenzoyl)acetanilide in 50 ml. of pyridine and 1 ml. of piperidine was refluxed for 26 hours. After this time the pyridine was removed in vacuo and the residue dissolved in 100 ml. of a boiling mixture of alcohol:concentrated hydrochloric acid:water (1:5:5). Decolorizing carbon was added and after keeping the mixture on the steambath for about 5–10 minutes all insoluble material was collected on a filter. The clear solution was cooled and neutralized with ammonia and extracted with a mixture of dichloromethane and ether. The organic phase was evaporated and the residue recrystallized from tetrahydrofuran/benzene, yielding 3-amino-5-(2-nitrophenyl)-2(1H)-quinolone as crystals melting at 237-240°.

The above-mentioned 2-amino-2'-(2-nitrobenzoyl) acetanilide and its preparation are not a part of this invention, but such are disclosed hereinbelow in order that this disclosure may be complete.

To a solution of 62 g. of 2-amino-2'-nitrobenzophenone in 200 ml. of dichloromethane, 27 ml. of bromoacetyl bromide was added dropwise. The solution was refluxed for 2 hours, cooled, washed with sodium bicarbonate solution, and evaporated to dryness. The residue was crystallized from benzene giving crystals of 2-(2-bromoacetamido)-2'-nitrobenzophenone melting at 157-159°.

To a solution of 20 g. of 2-(2-bromoacetamido)-2'-nitrobenzophenone in 200 ml. of tetrahydrofuran, an excess of liquid ammonia (ca. 200 ml.) was added. The ammonia was kept refluxing for 4 hours using a Dry-Ice condenser. Then the ammonia was allowed to evaporate slowly. After an over-all reaction time of 17 hours, the solution was concentrated in vacuo and poured into a sodium bicarbonate solution. The solid material was filtered off and recrystallized from alcohol yielding crystals of 2-amino-2'-(2-nitrobenzoyl)-acetanilide melting at 157-159°.

*Example 11*

On heating 2-(2-aminoacetamido)-2',5-dichlorobenzophenone above its melting point or on refluxing the same compound in pyridine with addition of piperidine, 3-amino-6-chloro-4-(2-chlorophenyl)-2(1H)-quinolone was obtained which after recrystallization from a mixture of tetrahydrofuran and ether melted at 295-297°.

*Example 12*

20 ml. of 1 N sodium methoxide in methanol was added to a solution of 7 g. of 5,2'-dichloro-2-(2-dimethylaminoacetamido) benzophenone in 40 ml. of methanol. The methanol was evaporated in vacuo, the residue dissolved in 50 ml. of dimethylformamide, and 3 ml. of methyl iodide then added. A spontaneous rise in temperature to 50° was observed. After 30 minutes the solvent was removed in vacuo, the residue dissolved in ether, the ether solution washed with water and dried. Concentration of the ether solution and addition of hexane gave crystals of 6-chloro-4-(2-chlorophenyl)-3-dimethylamino-1-methyl-2(1H)-quinolone, which after recrystallization from methanol, melted at 141-143°.

*Example 13*

From a solution of 0.5 g. of 3-amino-6-chloro-4-(2-chlorophenyl)-2(1H)-quinolone in 20 ml. of 1 N methanolic sodium methoxide, the solvent was removed in vacuo. The residue was dissolved in 20 ml. of dimethylformamide; 2 ml. of methyl iodide was added, and the mixture warmed for 30 minutes. The solvent was then distilled off in vacuo and the residue treated with water. The water insoluble material was filtered off and recrystallized from methanol yielding 3-amino-6-chloro-4-(2-chlorophenyl)-1-methyl-2(1H)-quinolone melting at 220-223°.

*Example 14*

A small amount of 3 - amino - 6 - chloro - 4 -(2 - chlorophenyl)-1-methyl-2(1H)-quinolone was heated in trimethylphosphate for 17 hours at 130°. After treatment with aqueous sodium hydroxide, 6-chloro-4-(2-chlorophenyl)-3-dimethylamino-1-methyl-2(1H)-quinolone was isolated after recrystallization from methanol and melted at 138-139°.

*Example 15*

48.8 g. of 2-bromoacetamido-4'-fluorobenzophenone was dissolved in 250 ml. of tetrahydrofuran and cautiously added to approximately 500 ml. of liquid ammonia. The ammonia was allowed to evaporate overnight and the solvent was then removed under reduced pressure. The residue was partitioned between 200 ml. of water and 200 ml. of methylene chloride. The layers were separated, the methylene chloride layer washed with water and dried over anhydrous sodium sulfate, filtered and evaporated. The residual oil was refluxed for 5 hours in 300 ml. of benzene. Removal of the benzene and recrystallization from ethanol yielded 3-amino-4-(4-fluorophenyl)-2(1H)-quinolone as white prisms melting at 268-269°.

By the above described method, commencing from the appropriate 2-bromoacetamido-4' - fluorobenzophenone, the following 3-amino-4-phenyl-2(1H)-quinolones were prepared:

6-chloro-3-amino-4-(4-fluorophenyl)-2(1H)-quinolone, M.P. 293-295°.
 (Recrystallized from acetone)

6-fluoro-3-amino-4-(4-fluorophenyl)-2(1H)-quinolone, M.P. 295-296°.
 (Recrystallized from acetone)

The above-mentioned 2-bromoacetamido-4'-fluorobenzophenones and their preparation are not a part of this invention, but such are disclosed hereinbelow in order that this disclosure may be complete.

A solution of bromoacetyl bromide (17.6 ml.) in benzene (17.6 ml.) was slowly added to a stirred, refluxing solution of 2-amino-4'-fluorobenzophenone (36.2 g.) in benzene (200 ml.). The mixture was stirred at reflux for 90 minutes after the addition had been completed, and then poured into 1 l. of cold water. The layers were separated, the water layer was extracted with methylene chloride (2 x 50 ml.), and the combined organic layers washed with 30% sodium carbonate solution (3 x 100 ml.), water (3 x 50 ml.), saturated brine (2 x 100 ml.), then concentrated under reduced pressure to dryness. The crystalline residue was recrystallized from methanol to give 2-bromoacetamido-2'-fluorobenzophenone as white needles, M. P. 114.5-115.5°.

P-fluorobenzoyl chloride (222.8 g.) was added in a 5 l., 3 neck round bottom flask, fitted with a thermometer, condenser and stirrer, to 150° and p-fluoroaniline (89 g.) was added. The temperature was raised to 180° and zinc chloride (140 g.) was introduced. The temperature was maintained at 210-220° for 40 minutes and then the reaction was quenched by the careful addition of 500 cc. of 3 N hydrochloric acid. The mixture was brought to the boil and the acid portion decanted. The process of boiling with 500 cc. portions of 3 N hydrochloric acid was repeated 3 times. The residue was then refluxed in a mixture of 600 ml. of sulfuric acid, 500 ml. of acetic acid and 350 ml. of water for 18 hours. The mixture was then cooled and made alkaline with 10 N sodium hydroxide, keeping the temperature below 30° by external cooling. The yellow precipitate was filtered, dissolved in methylene chloride (1 l.) and washed with 6 N hydrochloric acid (3 x 500 cc.). The organic layer was then washed acid free with water (4 x 100 cc.), dried over anhydrous sodium sulfate, filtered and concentrated to an oil. The residue was dissolved in hexane, filtered, concentrated and allowed to crystallize. The crystals were filtered giving 2-amino-5,4'-difluorobenzophenone as yellow needles, M.P. 108-108.5°.

A solution of bromoacetyl bromide (1.46 ml.) in benzene (1.5 ml.) was slowly added to a stirred, refluxing solution of 2-amino-4',5-difluorobenzophenone (3.4 g.) in benzene (50 ml.). The mixture was stirred at reflux for 90 minutes after the addition had been completed, and then poured into 500 cc. of cold water. The layers were separated, the water layer was extracted with methylene chloride (2 x 50 ml.), and the combined organic layers were washed with 30% sodium carbonate solution (3 x 100 ml.), water (3 x 50 ml.), saturated brine (2 x 25 ml.), and concentrated under reduced pressure to dryness. The crystalline residue was recrystallized from methanol to give 2-bromoacetamido-5,4'-difluorobenzophenone as white needles, M.P. 110-114°.

Example 16

A mixture of 20.0 g. of 7-chloro-5-phenyl-3H-1,4-benzodiazepin-2(1H)-one, 50 ml. of acetic anhydride and 2 drops of sulfuric acid was refluxed for 3½ hours. The reaction mixture was cooled, poured over 500 g. of ice and extracted with three 100 ml. portions of methylene chloride. The extracts were combined, washed with 30% sodium carbonate solution (3 x 50 ml.), water (3 x 100 ml.), saturated brine (1 x 100 ml), dried over anhydrous sodium sulfate, treated with charcoal and filtered. The resulting solution was concentrated in vacuo to an oil, dissolved in methanol and filtered. The filtrate was chromatographed on grade I alumina, yielding 2-acetylaminoacetamido-5-chlorobenzophenone.

We claim:
1. 6-halo-4-(halophenyl)-3-amino-2(1H)-quinolone.
2. A compound selected from the group of compounds consisting of compounds of the formula

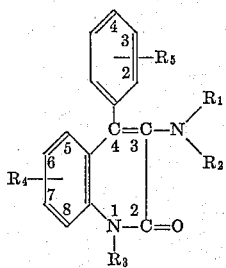

and pharmaceutically acceptable acid addition salts thereof
wherein $R_1$ and $R_2$ are each selected from the group consisting of hydrogen, lower alkyl and, taken together, lower alkylene; $R_3$ is selected from the group consisting of hydrogen and lower alkyl and $R_4$ and $R_5$ are each selected from the group consisting of hydrogen, halogen, trifluoromethyl, nitro, lower alkylmercapto and lower alkoxy, $R_4$ being other than halogen when $R_5$ is hydrogen.

3. 6-chloro-4-(2-fluorophenyl)-3-amino-2(1H)-quinolone.
4. 6-chloro-4-(2-chlorophenyl)-3-dimethylamino-1-methyl-2(1H)-quinolone.
5. 3-amino-4-(2-nitrophenyl)-2(1H)-quinolone.
6. 6-trifluoromethyl-3-amino-4-phenyl-2(1H)-quinolone.
7. 3-amino-4-(2-trifluoromethylphenyl)-2(1H)-quinolone.

8. A process for the preparation of compounds of the formula

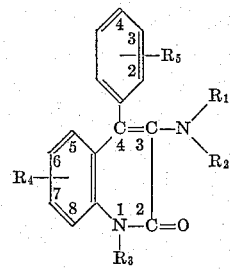

wherein $R_1$ and $R_2$ are each selected from the group consisting of hydrogen, loyer alkyl and, taken together, lower alkylene and at least one of $R_1$ and $R_2$ is other than hydrogen; $R_3$ is selected from the group consisting of hydrogen and lower alkyl and $R_4$ and $R_5$ are each selected from the group consisting of hydrogen, halogen, trifluoromethyl, nitro, lower alkylmercapto and lower alkoxy, $R_4$ being other than halogen when $R_5$ is hydrogen
which comprises heating a compound of the formula

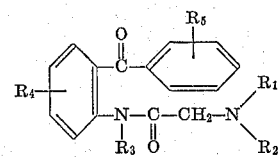

wherein $R_1$, $R_2$, $R_3$, $R_4$ and $R_5$ have the same meaning as above
whereby to effect the cyclization thereof.

References Cited by the Examiner
UNITED STATES PATENTS

| | | | |
|---|---|---|---|
| 2,794,020 | 5/57 | Harris et al. | 260—288 |
| 2,901,485 | 8/59 | Broady et al. | 260—288 |
| 2,912,460 | 11/59 | Ehrhart et al. | 260—562 |
| 3,005,823 | 10/61 | Kaeding | 260—287 |
| 3,014,036 | 12/61 | Hoover | 260—287 |
| 3,042,720 | 7/62 | Paabo | 260—562 |
| 3,066,145 | 11/62 | Sulkowski | 260—288 |

OTHER REFERENCES

Brossi et al.: Helv. Chim. Acta., volume 43, pages 1459–1471 (1960).

NICHOLAS S. RIZZO, *Primary Examiner.*
WALTER A. MODANCE, *Examiner.*

UNITED STATES PATENT OFFICE
CERTIFICATE OF CORRECTION

Patent No. 3,202,661

August 24, 1965

Bernard Brust et al.

It is hereby certified that error appears in the above numbered patent requiring correction and that the said Letters Patent should read as corrected below.

Column 9, line 52, for "Example 105" read -- Example 5 --; line 56, for "2-bromacetamido-" read -- 2-bromoacetamido- --; column 11, line 3, for "3-amino-5-" read -- 3-amino-4- --.

Signed and sealed this 28th day of June 1966.

(SEAL)
Attest:

ERNEST W. SWIDER
Attesting Officer

EDWARD J. BRENNER
Commissioner of Patents